March 27, 1934.  J. B. HAWLEY  1,952,168

FIBROUS ARTICLE AND METHOD OF AND MEANS FOR MAKING THE SAME

Filed June 29, 1931  6 Sheets-Sheet 1

Inventor:
Jesse B. Hawley
By: Wallace R. Lane, Atty.

March 27, 1934. J. B. HAWLEY 1,952,168
FIBROUS ARTICLE AND METHOD OF AND MEANS FOR MAKING THE SAME
Filed June 29, 1931 6 Sheets-Sheet 3

Inventor:
Jesse B. Hawley
By: Wallace R. Lane. Atty.

March 27, 1934.  J. B. HAWLEY  1,952,168
FIBROUS ARTICLE AND METHOD OF AND MEANS FOR MAKING THE SAME
Filed June 29, 1931  6 Sheets-Sheet 4

Inventor:
Jesse B. Hawley
By: Wallace R. Lane. Atty.

March 27, 1934.   J. B. HAWLEY   1,952,168
FIBROUS ARTICLE AND METHOD OF AND MEANS FOR MAKING THE SAME
Filed June 29, 1931   6 Sheets-Sheet 5

Inventor:
Jesse B. Hawley
By Wallace R. Lane. Atty.

Inventor:
Jesse B. Hawley
By: Wallace R. Lane. Atty.

Patented Mar. 27, 1934

1,952,168

UNITED STATES PATENT OFFICE 1,952,168

FIBROUS ARTICLE AND METHOD OF AND MEANS FOR MAKING THE SAME

Jesse B. Hawley, Geneva, Ill.

Application June 29, 1931, Serial No. 547,582

37 Claims. (Cl. 92—57)

The present invention relates to the making or producing of fibrous or like articles, such as sound producing diaphragmatic members and the like.

Among the objects of the invention is to provide a novel article which may be composed of different materials, yet will be unitary and integral.

In a specific illustrative embodiment of the invention, the article is in the form of a sound producing or reproducing diaphragmatic member, having a cone portion of pulp fibres and a flange or border portion of textile fibres. The cone part is comparatively stiff while the border is very pliable or flexible to permit the free vibration of the cone part, the border part acting as a supporting means for the cone part.

At the junction of the cone part and the border part, the pulp and textile fibres are integrated, accreted or blended together, or interlaced, or matted, or merged with each other so that there is a continuity of material from the cone to the border part, the whole article being thus a single integral or integrated unitary member.

The border part may be a strip of felt of wool or cotton, or a mixture of the two or other textile fibres, such as linen and so forth, or such part may be in the form of a textile fabric whether felted, woven, knitted, netted, or otherwise produced, or the border portion may be formed from a felt bath and deposited and matted on a porous former either at the time when the pulp fibres are deposited and matted upon the conic part of the former, or at a time when the cone part of the former is blanked off to prevent deposit of pulp, after which the border portion may be blanked off, and the cone blanking means removed to permit deposit of the pulp, the pulp and textile fibres at the juncture integrating, blending and interlacing with each other to form an integral or integrated joint, or weld in the article.

Another object of the invention is to provide a novel process for producing the above mentioned article.

A further object is to provide a novel device for carrying out the process and to produce the article mentioned.

Other objects, capabilities, advantages, features, and process steps are comprehended by the invention as will later appear and as are inherently possessed by the invention.

Referring to the drawings.

Figure 1:
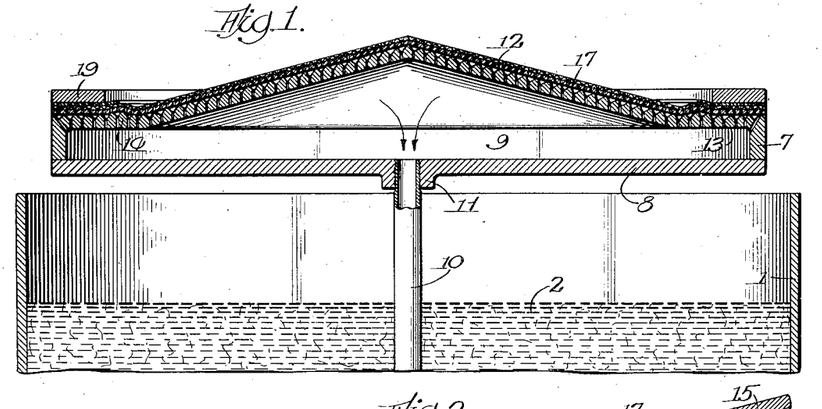
Fig. 1 is a view in section of a means for forming a fibrous article from a bath of the material used for such article.

Referring more in detail to the drawings, the means selected to illustrate the invention and to produce an article in accordance with the invention, is shown as comprising a receptacle or tank 1 in which is contained a bath 2 of wood or paper or like pulp or the like, the pulp being in suspension in a vehicle of water and maintained dispersed and in suspension by any suitable agitating or stirring means, such as air blown up through the bath.

In elevated position is shown a porous former comprising a plate 3 having ridges 4 on its surface, and between which ridges are defined drain troughs 5 communicating with drain outlets or passages 6 formed in the plate 3. At the edge, the plate has a flange 7 adapted to rest upon a plate or table 8 as clearly shown in Figs. 1 and 2. These plates 3 and 8 and flange 7, define a suction chamber 9 communicating with a suction pipe 10 secured in apertured part 11 of plate 8. The pipe 10 is connected to a suitable vacuum source, and also to suitable means for raising and lowering the table, pipe and former.

The specific form of article chosen to illustrate the invention, is that of a sound producing diaphragmatic member, and hence the porous former has a central conic part or portion 12, a flat marginal, or border or flange part or portion 13 and a curved or angular juncture or intermediate portion 14. Upon this former is placed a similarly shaped porous sheet metal member 15 provided with innumerable small or fine holes or pores 16. Upon member 15 may be located, although this is not always necessary, a foraminous or reticulated member 17. When this member is used it is usually easier to strip the blank deposited thereon, but when the blank is formed on the porous member 15, the blank may be readily stripped therefrom by either a suction on the upper side of the blank or air pressure acting upward through the pores 16.

Upon the border or flange part of the former, may be deposited or located a flat annular piece 18 of felt, such as felted or matted, or even woven textile fibres or the like. Such fibres may be wool, or cotton, or linen, or silk, or the like, or any combination thereof. Upon the piece 18 is placed a flat blanking ring 19. The latter is narrower than the felt piece 18, so as to leave exposed a portion 20 with which the other fibres integrate or blend when they are deposited as hereinafter described.

Figure 2:
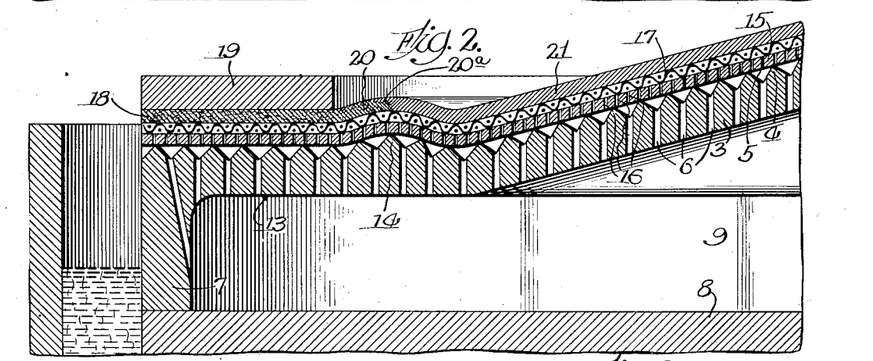
Fig. 2 is an enlarged fragmentary sectional view of the same showing an integrated deposit of fibres.

With a suction effective in the chamber 9 of the former, the former is lowered into the bath 2. Immediately, the pulp of the bath is deposited on the former member 17 or 15 as the case may be, and also upon the exposed portion 20 of the felt piece, the suction through the apertures and perforations of the former elements, acting to drain off the water and matting or accreting the pulp fibres 21 on the former. Inasmuch as the felt portion 20 is porous, pulp fibres will not only be deposited thereon, but will also be drawn into the interstices of the portion 20 and blend, merge, interlace and otherwise integrate, unite, or knit with the fibres of the part 20, thus forming a continuous and integral juncture, joint or like union or weld 20$^a$.

After the desired thickness of pulp is deposited, the former may be elevated, and the suction discontinued. The blank, comprising the pulp part 21, and the connected felt piece 18, may be dried in any suitable manner, as by heating in a suitable heater, or by hot air or the like. The blank may then be stripped from the former by either air pressure through the pores of the former, or by applying suction above the blank. The blank may be compressed, if desired, in suitable dies, and treated with sizing, latex, lacquers, and other similar materials, to give the cone part the desired stiffness and moisture proofing characteristics. The border may also be treated, as with latex or the like to moisture proof it, yet without in any way detracting from its suppleness and pliability.

In structures where the border, such as a strip of leather, rubber, cloth or the like is glued to the base of a paper cone, the band of attachment loads the cone so that its inertia is increased and the vibratile properties of the cone are hampered. By integrating or blending the material of the cone with the material of the border so as to effect an integral unit, this loading effect is eliminated and avoided, and the cone part is free to vibrate substantially as if it had no connection at its base, the border being very pliable and offering no resistance or impediment to movement of the cone part.

When paper cones are used, the cone is made from a flat sheet of paper cut sector shaped and rolled to form a cone and with over-lapping ends which are glued together. This also affects the cone by loading it along the overlapping portions. By the present invention, both the cone part and the border are made seamless and are molded to form, that is, to the final form or the form it is to have when used, and therefore there is no stress or strain in the article as would be present in one which is rolled up, distorted, and formed with a seam.

Figures 3, 4, 5:
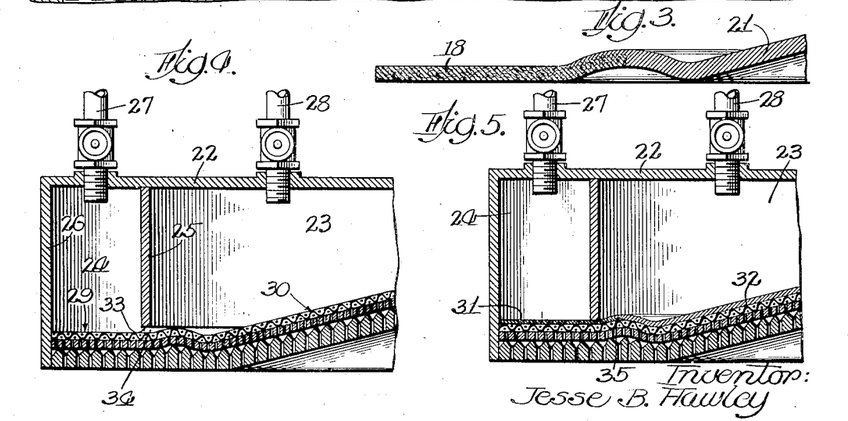
Fig. 3 is a fragmentary sectional view of an article produced in accordance with the invention.
Fig. 4 is a fragmentary sectional view of an alternate form of structure for depositing different kinds of material on different parts of a former.
Fig. 5 is a similar view showing the article in deposited condition.
Figure 6:
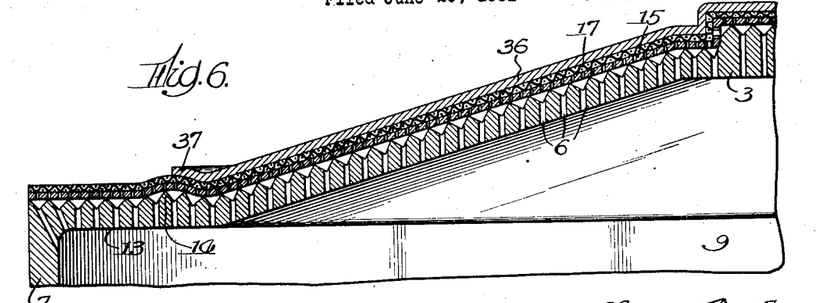
Fig. 6 is a fragmentary sectional view of a former with a blanking or stopping means on the conic part of the former.
Figure 7:
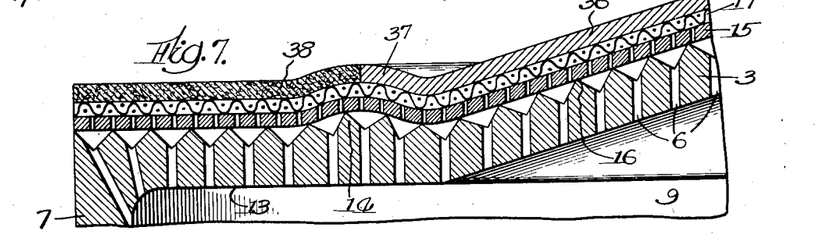
Fig. 7 is a similar view showing a deposit of border fibres.
Figure 8:
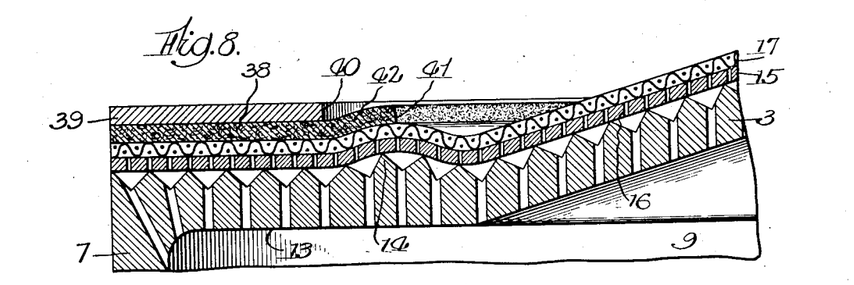
Fig. 8 is a similar view showing the application of a blanking or stopping means on the deposited border fibres and the blanking means for the conic part removed.

Instead of first placing a felt strip 18 on the former, this part may be deposited from a felt bath. A means for effecting such is shown in Figs. 4 and 5. In this case, a casing 22, located above the former, has two chambers, a central chamber 23 and an annular concentric chamber 24 separated from the central chamber 23 by an annular wall 25. The chamber 24 has an outer wall 26 extending beyond the edge of the former and also being located adjacent thereto. To the top of the casing are connected valved ducts 27 and 28 for delivering the fibrous mixtures of water or other fluid and textile, or pulp fibres.

To deposit the fibres on the respective annular and central parts or portions 29 and 30 of the former, such material as felt fibres and water may be delivered through duct 27 into chamber 24, to be deposited as a felted piece 31 as shown in Fig. 5. Likewise, such material as pulp fibres and water may be delivered through duct 28 into chamber 23 to be deposited as a matted or felted portion 32 as shown in Fig. 5.

It will be noted that the lower edge 33 of the partition 25, is spaced above the former to provide a gap or the like 34 whereby fibres from both chambers 24 and 23 may be deposited and integrated, interlaced, blended or knitted together in that gap, whereby the blank portions 31 and 32 of the article will have an integral joint, weld or juncture 35.

During the process of depositing these fibres, suction may be effected beneath the former, or if desired, the material may be supplied in chambers 24 and 23 under pressure whereby the water will be forced through the openings in the former. The valves of ducts 27 and 28 may be so regulated that the rates of deposit may be controlled to deposit the fibres in more or less balanced condition, or to effect a greater or less transmission of fibres from one side to the other side through the gap 34, depending upon the nature of the integration or blending to be effected in the juncture 35.

Inasmuch as the passage of the water will be easier through the deposit of one kind of material than another, the pressures in the chambers 24 and 23 will tend to differ, hence regulation of the valves of ducts 27 and 28 may be effected to maintain the pressures in the chambers substantially balanced.

The depositing and the integrating of the different fibrous material may be effected by the means shown in Figs. 6 to 26 inclusive, wherein one part of the former is blanked-off or covered with a stopper so that a fibrous material from a bath may be deposited and accreted upon the part of the former that is not blanked-off or stopped, after which the stopper is removed and another stopper is placed upon the stratum of deposited fibrous material, and then the depositing of fibrous material from another bath is effected on the part of the former from which the stopper has been removed, the adjoining edges of the deposited strata interlacing, integrating and blending to form an integral joint or juncture.

As shown in Figs 6 to 9 inclusive, a stopper or blanking member 36 preferably of any suitable imperforate thin material, such as sheet metal, foil, rubber composition, or the like, is placed upon the conic portion of the former, the border or margin 37 of the stopper 36 partly overlying the undulated portion 14 of the former. The former is then submerged in the bath, such as a bath of textile fibres or the like, and with the suction effective in the chamber 9, a stratum 38 of fibrous material is deposited and accreted upon the border portion of the former, as is clearly shown in Fig. 7. The former is then raised from the bath, the stopper 36 then removed, and another stopper or blanking member 39 placed upon the layer 38. It will be noted that the inner edge 40 of the stopper 39, is located back of the edge 41 of the stratum 38 to expose a sufficient portion 42 of that stratum 38 to be subjected to the accretions and interlacings of the pulp fibres to be deposited on the former and on said exposed portion.

Figure 9:
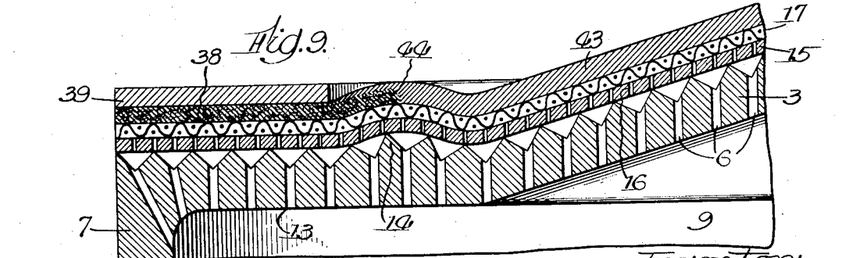
Fig. 9 is a similar means showing the integrated deposits of the fibres.
Figure 10:
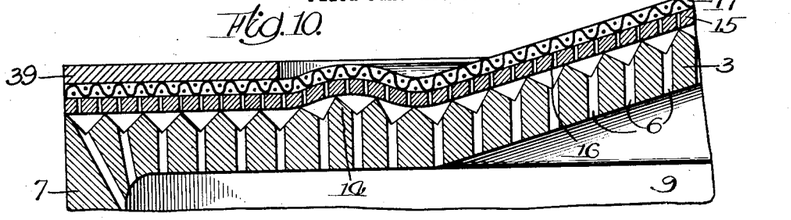
Fig. 10 is a similar view showing the step of first blanking the border portion and depositing fibres on the conic portion of the former.
Figure 11:
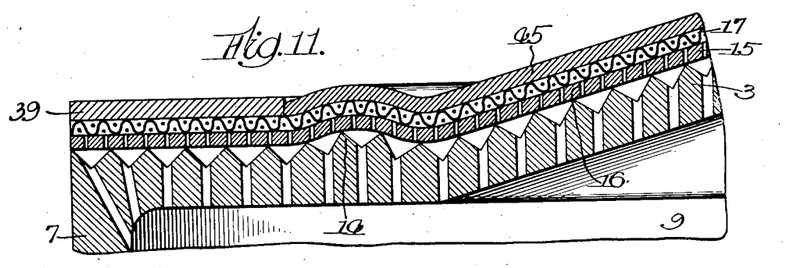
Fig. 11 is a similar view showing the deposit of pulp fibres on the conic part of the former.
Figure 12:
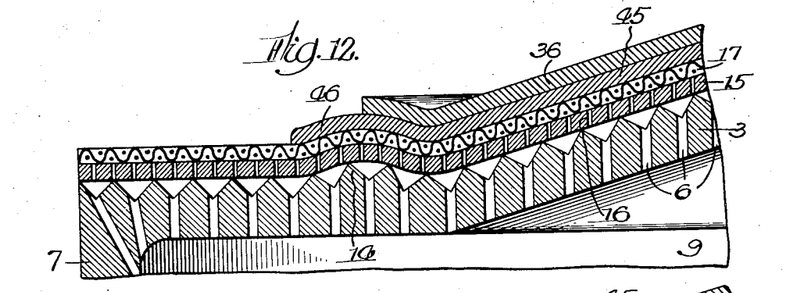
Fig. 12 is a similar view showing the blanking of the deposited fibres on the conic part of the former, and the removal of the border blanking means.
Figure 13:
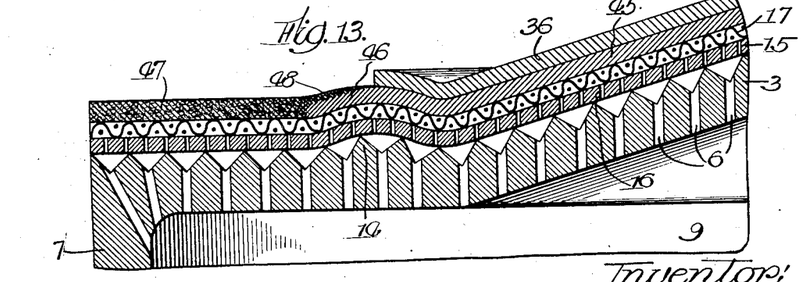
Fig. 13 is a similar view showing the integration of the fibrous deposits.
Figure 14:
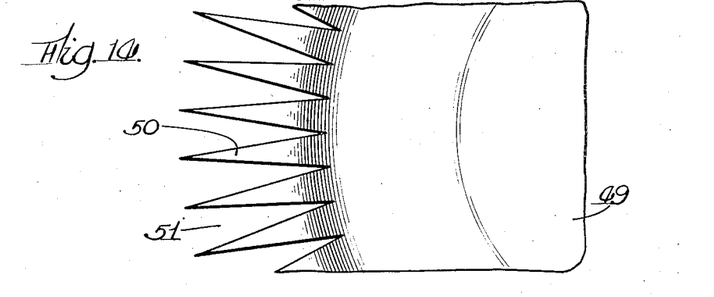
Fig. 14 is a fragmentary top plan view showing the use of a serrated or dentated blanking member.
Figure 15:
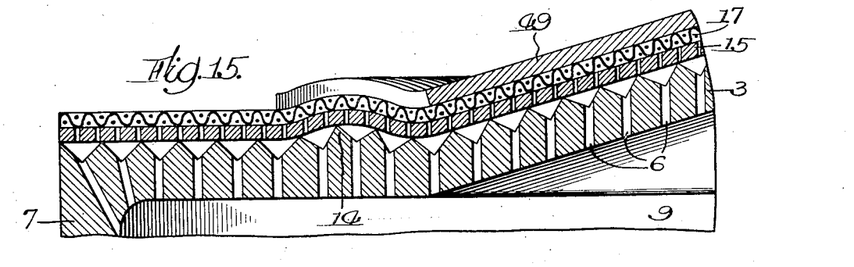
Fig. 15 is a fragmentary sectional view of a former and a serrated or dentated blanking means on the conic part of the former.
Figure 16:
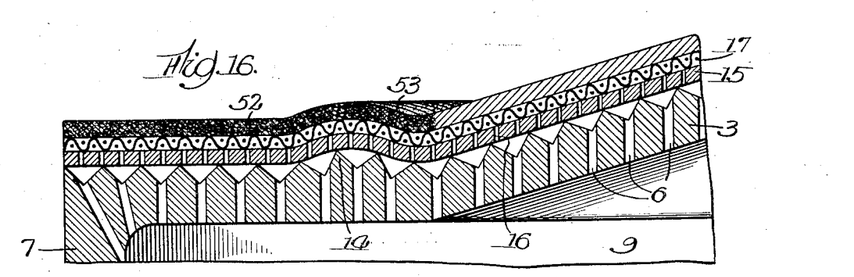
Fig. 16 is a similar view showing the deposit of border fibres on the former and in the clefts between the serrations of the blanking member.

The former is then submerged into another bath, such as a pulp or like bath, and with the suction effective in chamber 9, a layer or stratum 43 of pulp fibres is deposited upon the conic portion of the former, and also upon the exposed portion 42, such that there is an interlacing, blending, integrating and uniting of the pulp fibres with the textile fibres so as to form an integral union or joint or like 44, the portion 42 being pervious or porous so that the pulp fibres will enter the interstices thereof for such integrating and uniting.

In Figures 10 to 13 the pulp fibres are deposited before the textile fibres. In this case a border blanking member or stopper 39 is placed upon the border portion of the former, and the former is submerged in a pulp or like bath to effect a deposit of pulp fibres in a stratum 45 on the conic and undulated portions of the former, as clearly shown in Fig. 11. The stopper 39 is then removed and a stopper or blanking member 36 is placed upon the stratum 45 but to leave a portion 46 of this stratum exposed. The former is then submerged in a textile or like bath to cause a deposit of the border stratum 47 as is clearly shown in Fig. 13. Some of these fibres will be interlaced and accreted with the exposed porous portion 46 of the pulp stratum 45 so as to interlace, integrate, blend and knit therewith to form a unitary and integrated joint 48 or the like.

The above is described in connection with stoppers or blanking members having plain edges or marginal portions. The invention comprehends the use of stoppers or blanking members having irregular edges, such as are serrated, dentated, undulated, ribbed, curled, curved, or the like, to aid in the integrating of the fibres at the juncture between the conic and border portions of the diaphragmatic member.

As shown in Figs. 14 to 21, a stopper or blanking member 49 having teeth 50 with clefts 51 there among, may be placed upon the conic portion of the former, after which, the device is submerged in a textile fibrous bath and a deposit of stratum 52 of fibrous material (Fig. 16), is effected on the unstopped portion of the former. This deposit will extend into the clefts 51 so as to form serrations, dentations or the like 53 along the inner margin of the stratum 52.

Figure 17:
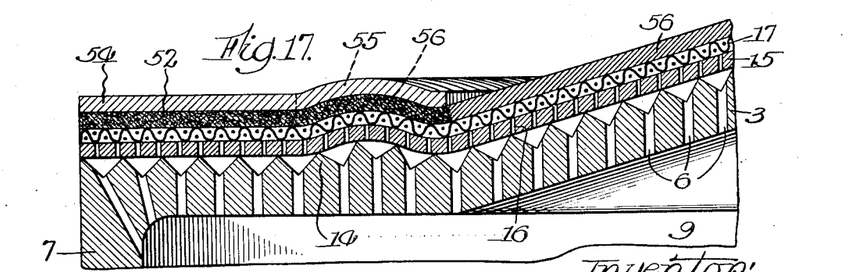
Fig. 17 is a similar view showing the use of a blanking member for the deposited border fibres and having serrations or dentations.
Figure 18:
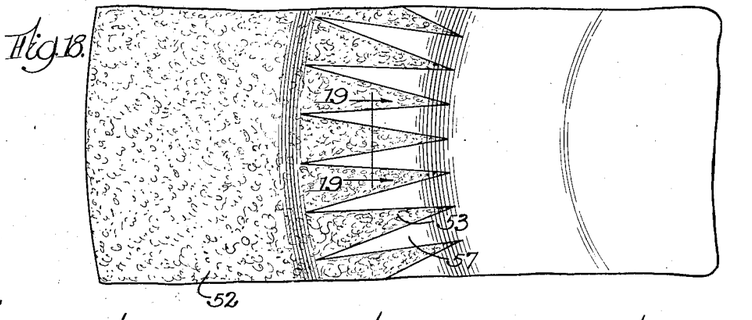
Fig. 18 is a fragmentary top plan view of a serrated blanking member of deposited fibres.

With the device emerged from the bath, the stopper 49 may be removed, and a border stopper or blanking member 54 having teeth or the like 55, may be placed upon the stratum 52 so that the teeth 55 will overlie the projections 53 of the fibrous stratum 52. Then the device is submerged in another bath, so as to deposit a stratum 56 upon the conic and undulated part of the former, with serrations, dentations, and the like 56 in the clefts 57 between the projections 53 of the stratum 52. The suction through the porous material 52, particularly beneath the teeth 55 will cause an interlacing, integrating, knitting, blending, and the like, of the pulp fibres of teeth 56 therewith, so that there is formed a continuous and unitary integral diaphragmatic blank, with a sort of splice-like juncture between the conic and border portions of the blank. Instead of a toothed stopper 54, a plain edged stopper 39 or a curled edge stopper 66 (later described) may be used.

Figure 19:
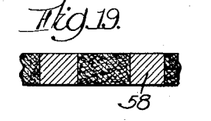
Figs. 19, 20 and 21 are fragmentary sectional views taken substantially in a plane represented by line 19—19 in Fig. 18, and showing different forms of teeth at the margin of the blanking members.
Figure 20:
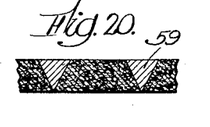
Figure 21:
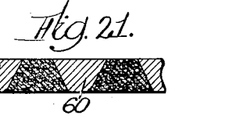
Figure 22:
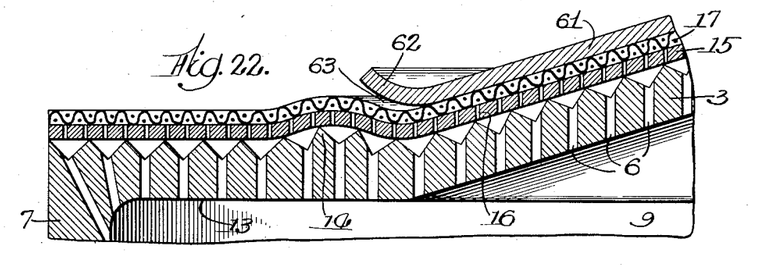
Fig. 22 is a fragmentary sectional view of a former and a conic blanking member having a curled marginal portion.

The teeth of the stopper may be square or rectangular in cross-section, as teeth 58 in Fig. 19, or triangular or tapered for a draft, as teeth 59 in Fig. 20, or trapezoidal and tapered for a draft, as teeth 60 in Fig. 21.

If desired the border blank may be first placed upon the former to first deposit pulp fibres on the conic portion of the former, and then removed for the deposit of the textile fibres on the border portion of the former, while stopping the conic portion of the blank.

By tapering the teeth, the deposited fibres in the clefts will have inclined surfaces through which a suction will cause a more extended interlacing, accreting, and integrating of the subsequently deposited fibres.

A splice-like union may also be effected by the use of curled edge stoppers. In Figs. 22 to 27, is shown a conic stopper or blanking member 61 having a curled or curved marginal portion 62, forming a beveled or tapered space 63 between the curl 62 and the former. When the former and this stopper, are submerged in a textile fibrous bath, a stratum 64 is deposited upon the exposed portion of the former, with a tapered or beveled part 65 formed or deposited beneath the curl 62.

Figure 23:
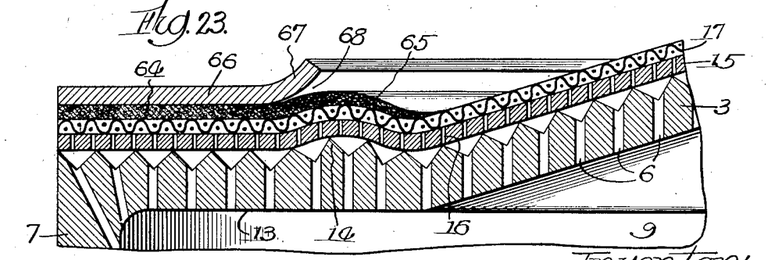
Fig. 23 is a similar view showing a border blanking member having a curled marginal portion.
Figure 24:
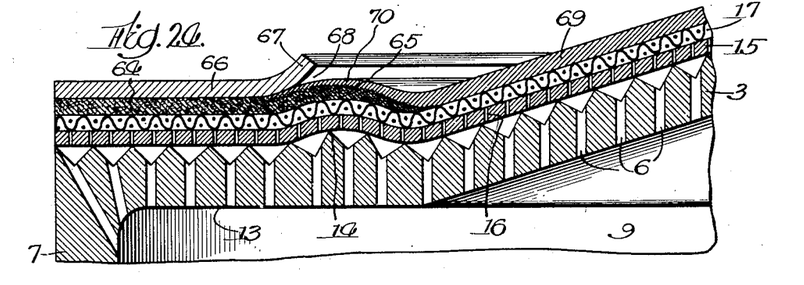
Fig. 24 is a similar view showing integrated fibrous deposits with a splice-like juncture or joint.
Figure 25:
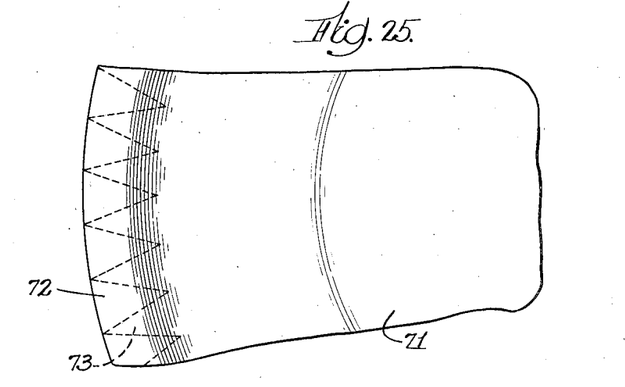
Fig. 25 is a fragmentary top plan view of a blanking member having a curled and ribbed marginal portion.

After raising the device and deposited stratum 64, the stopper is then removed, and a border stopper 66 having a curled or curved edge 67 is placed upon the stratum 64, so as to leave a tapered space 68 between the curl 67 and the tapered portion 65 of the stratum 64. The device is then submerged in another bath, such as a pulp bath, for the deposit of a pulp stratum 69 having a tapered or beveled portion 70 overlying and integrating, interlacing, accreting and knitting with the porous portion 65 of the stratum 64, so as to form an integrated joint, or union, or junction.

If desired the process may be reversed, whereby the blanking member 66 may be first applied to the former for the first deposit of pulp fibres, and removing stopper 66, placing on stopper 61, and depositing the stratum 64 so as to deposit portion 65 on portion 70 and to integrate the two together into a unitary and integral joint or juncture.

Figure 26:
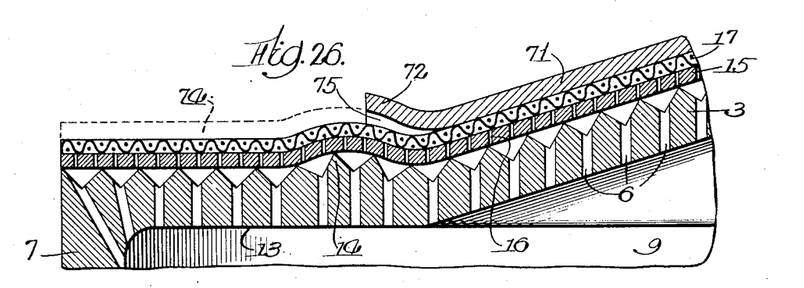
Fig. 26 is a fragmentary sectional view of a former and a blanking member shown in Fig. 25.
Figure 27:
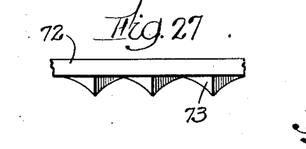
Fig. 27 is a fragmetnary elevational view of the blanking member shown in Fig. 25.

When it is desired to integrate the strata of fibres with both the curled and serrated stopper effects, a stopper 71, such as the conic stopper, may have a curl 72, and ribs or the like 73 on the under side of the curl, as clearly shown in Figs. 26 and 27. The textile fibres may be deposited to form a stratum 74 with a tapered portion 75 having grooves therein. This stratum 74 may then be blanked off with a curled edge stopper, such as stopper 66, so as to deposit a pulp stratum with a portion integrated with the grooved and tapered portion 75. In this way there is a more extended interlacing and integrating of the different fibres from the conic and border portions of the diaphragmatic blank. If desired the process may be reversed, whereby the border stopper with a curled and ribbed portion is first applied, and then a curled edge stopper, such as stopper 61, is applied on the conic portion of the blank.

The invention is not limited to the particular processes, article and means disclosed, but may comprehend other structures, details, arrangements of parts, features and process steps without departing from the spirit of the invention.

Having thus disclosed the invention:

I claim:

1. A vibratile sound producing article of diaphragmatic type comprising parts of different kinds of fibres, a portion of the fibres of one part being integrated with a portion of the fibres of another part to form an integral article.

2. A sound producing diaphragmatic member comprising a vibratile part of fibrous material, and a pliable part of a different kind of fibrous material, the fibres of the adjoining portions of said parts being integrated together to form an integral member.

3. A sound producing diaphragmatic member comprising a cone of pulp fibres, a border of textile fibres, and a joint therebetween of integrated pulp and textile fibres to form an integral member.

4. A sound producing diaphragmatic member comprising a cone of felted pulp fibres, a rim of felted textile fibres, the edge of the cone and the inner margin of the rim being felted together to form an integral union between the cone and rim.

5. In a process of making a vibratile fibrous sound producing diaphragmatic article, the step of integrating one fibrous part to another to form an integral article.

6. In a process of making a fibrous sound producing article, the steps of depositing part of a body of fibres upon a part of another body of fibres, and interlacing the fibres of said parts to form an integral article.

7. In a process of making a fibrous sound producing article, the steps of depositing fibres on a porous former and upon the margin of a fibrous piece, and interlacing the fibres deposited on said piece with the fibres of said piece to form an integral article.

8. In a process of making a vibratile fibrous sound producing diaphragmatic article, the steps of depositing pulp fibres on a porous former, depositing textile fibres upon a porous former, and interlacing part of the pulp fibres with part of the textile fibres to form an integral article.

9. In a process of making a vibratile fibrous sound producing diaphragmatic article, the steps of making a part of the article of one kind of fibres, making another part of another kind of fibres, and integrating the fibres of the adjoining portions of said parts to form an integral article.

10. In a process of making a fibrous sound producing article, the step of integrally joining the parts of the article by integrating the fibres at the edge of a part with the fibres at the edge of another part.

11. In a process of making a fibrous sound producing article, the steps of forcing fibrous materials from different fibrous baths upon different parts of a former, and blending fibres from one bath with fibres of another bath at the junction of the different parts of the former to form an integral article.

12. In a process of making a sound producing diaphragmatic member, the steps of placing a fibrous textile piece upon a part of a former, depositing pulp fibres upon the remainder of said former, and interlacing a portion of said fibres with a portion of said piece to form an integral member.

13. In a process of making a sound producing diaphragmatic member, the steps of depositing textile fibres upon a portion of a former, depositing pulp fibres upon the remainder of said former, and integrating the adjoining portions of said deposits of fibres to form an integral member.

14. In a process of making a sound producing diaphragmatic member, the steps of depositing felted textile fibres upon a rim portion of a porous former, depositing pulp fibres upon a cone portion of said former, and integrating pulp fibres with textile fibres at the juncture of said rim and cone portions of said former to form an integral member.

15. In a process of making a sound producing diaphragmatic member, the steps of depositing felted textile fibres upon a rim portion of a porous former, blanking off a part of said felted fibres, depositing pulp fibres upon a cone portion of said former, and integrating the exposed part of said felted fibres with pulp fibres at the juncture of said rim and cone portions of said former to form an integral member.

16. A device for making an integral fibrous article, comprising a porous former, means for blanking off a portion of fibrous material deposited on said former, and means for depositing fibrous material on said former and integrating the same with the material exposed beyond the blanking means.

17. A device for making an integral fibrous article, comprising a porous former having a portion for the deposit thereon of pulp fibres, and a portion for the deposit thereon of textile fibres, and means for depositing pulp fibres and textile fibres on said portions with a part of the pulp fibres interlacing with a part of the textile fibres to form an integral article.

18. A device for making an integral fibrous article, comprising a porous former, and chambers associated with different parts of said former for holding and supplying different fibres to said different parts of said former.

19. A device for making an integral fibrous article, comprising a porous former, chambers associated with different parts of said former for holding and supplying different fibres to said different parts of said former, and a wall between said chambers and having its edge spaced from said former for the integration of the fibres from the adjacent chambers in said space.

20. A device for making an integral sound producing diaphragmatic member, comprising a porous former having a central conic part and a flat marginal part, concentric chambers respectively above said former parts, and a wall between said chamber and having its lower edge spaced from said former at the juncture between said former parts to provide a space for the integration of the fibres from said chambers.

21. A fibrous sound producing vibratile article comprising integrated parts of different kinds of fibres.

22. In a process of making a fibrous sound producing vibratile article, the step of integrating different fibrous parts to form a single integral unit.

23. A device for making an integral fibrous sound producing article, comprising a porous former, means for blanking off a portion of said former for the depositing of a stratum of fibrous material on the remainder of said former, and means for blanking off a portion of said stratum for the deposit and integrating of other fibres on said former and with the unblanked portion of said stratum.

24. In a device for making fibrous sound producing articles and having a porous former, a blanking member having a contoured surface similar in shape to a portion of said former.

25. In a device for making fibrous sound producing articles and having a porous former, a blanking member having a contoured surface similar in shape to a portion of said former, and having a serrated marginal portion.

26. In a device for making fibrous sound producing articles and having a porous former, a blanking member having a contoured surface similar in shape to a portion of said former, and having a curled marginal portion.

27. In a device for making fibrous sound producing articles and having a porous former, a blanking member having a contoured surface similar in shape to a portion of said former, and having a curled and ribbed marginal portion.

28. In a device for making fibrous sound producing articles and having a porous former, a blanking member having a contoured surface similar in shape to a portion of said former, and having serrations at the marginal portion of said member, said serrations being tapered in cross-section.

29. In a device for making fibrous sound producing articles and having a porous former, a blanking member having a contoured surface similar in shape to a portion of said former, and a second blanking member having a contoured surface similar in shape to another portion of said former and spaced from said first member.

30. In a process of making a fibrous sound producing article upon a porous former, the steps of blanking off a portion of said former, accreting fibrous material on the exposed portion of the former, blanking off a portion of said accreted material, exposing said first portion of said former, and accreting fibrous material on said exposed portion of said former and integrating a portion of said latter material with the exposed portion of said first material.

31. In a process of making a fibrous sound producing article upon a porous former, the steps of blanking off a portion of said former, submerging said former and member in a bath of fibrous material, accreting fibrous material upon the exposed portion of said former, moving said former, and accreted material from said bath, exposing the blanked-off portion of said former, blanking off a portion of said accreted material, submerging said former and said partly blanked-off accreted material in a bath of other fibrous material, accreting said latter material upon the exposed portion of said former, and integrating a portion of said latter material with the exposed portion of said first accreted material.

32. In a process of making a fibrous sound producing article upon a porous former, the steps of accreting a stratum of fibrous material upon a portion of said former while stopping off accretions upon the remainder of said former, and then accreting a stratum of other fibrous material upon said remainder of said former while stopping off accretions on said first stratum, and integrating portions of said strata to form a unitary integral article.

33. In a process of making a fibrous sound producing article on a porous former, the steps of accreting soft fibrous material on a portion of said former, and accreting hard fibrous material on another portion of said former, and integrating the adjoining portions of said accreted materials to form a unitary integral article.

34. In a process of making a fibrous sound producing article on a porous former, the steps of accreting soft fibrous material on a portion of said former while blanking off another portion of the former, and accreting hard fibrous material upon the latter portion of said former while integrating a portion of said latter material with a portion of said accreted soft fibrous material to form a unitary integral fibrous article.

35. In a process of making a fibrous sound producing article on a porous former, the steps of accreting soft fibrous material on a portion of said former while blanking off another portion of the former, exposing said latter portion of said former, and accreting hard fibrous material on said exposed portion of said former while blanking off a portion of said accreted soft fibrous material, and integrating a portion of said hard fibrous material with the exposed portion of said soft fibrous material.

36. An integral fibrous sound producing article comprising a hard fibrous portion and a soft fibrous portion with a blended and integrated union between said portions.

37. An integral fibrous sound producing article comprising a vibratile conic portion of hard fibres, a supporting border portion of soft fibres, and an integrated and blended juncture between said portions.

JESSE B. HAWLEY.